Patented Apr. 26, 1949

2,468,402

UNITED STATES PATENT OFFICE 2,468,402

METHOD OF MARKING GLASS

Norbert J. Kreidl, Irondequoit, and Lewis P. Ohliger, Brockport, N. Y., assignors to Bausch & Lomb Optical Company, Rochester, N. Y., a corporation of New York No Drawing. Application June 14, 1945, Serial No. 599,526

4 Claims. (Cl. 117—1)

This invention relates to methods of applying to optical glass articles a permanent marking as, for example, a trade mark, or other identifying symbol, of such a character as to be normally invisible, or substantially so, but capable of being temporarily developed into visible form for purposes of inspection.

It has been proposed in the known art to accomplish such marking in various ways, but in such known ways the marking has objectionably altered the characteristics of the glass, or has not been normally invisible to the desired degree, or capable of being rendered visible by convenient means, or has required expensive, complicated, or impracticable methods, so that such prior known ways of marking have not been entirely satisfactory.

One object of the present invention is to provide a more simple and practical method for applying to optical glass a permanent mark which is normally completely invisible when illuminated by ordinary daylight or artificial light, but is capable of being temporarily developed to distinct visibility for purposes of inspection.

Another object is to provide a method of the above character capable of being employed in a practicable way as, for example, in the quantity production of lenses, with a minimum of labor and expense.

Another object is to provide such a method in which the applied mark is adapted to be quickly and conveniently developed for purposes of inspection.

A further object is to provide lenses or other optical glass articles having the improved marking afforded by the above described method.

To these and other ends the invention resides in certain improvements and combinations of parts, all as will be hereinafter more fully described, the method steps and novel features being pointed out in the claims at the end of the specification.

The common glasses are believed to comprise a network of strongly bonded silicon and oxygen ions with monovalent alkaline oxides, such as the oxides of sodium and potassium, in which the alkaline elements are less strongly bonded to the basic network by oxygen linkages. It has been found that the composition of the surface of such a glass can be altered by heating it under exposure to certain reagents, such as metallic salts, during which treatment the monovalent alkaline elements in the glass, such as sodium ions, are replaced by the electro-positive metallic atoms or ions of the treating reagents, the rate of such interchange or interdiffusion of the metal for the alkaline elements having been found to depend upon the nature of the compositions employed and the time, temperature and other conditions of treatment.

Such penetration of the glass by metallic atoms from the treating reagent may be conducted with such intensity and resulting density of the atoms in the glass as to effect a distinct change in the index of refraction of the glass at such treated portions, and the development of a distinctly visible color in the glass, so as to be unsuitable for the purposes of the present invention. It has been found that those treating reagents which have a high rate of decomposition at a temperature at which the diffusion rate of the metal atoms into glass is high, tend to produce an intensive or dense penetration of the ions into the glass of the character referred to above. It has also been found that the depth to which such penetration of the glass proceeds increases with an increase in the duration or temperature of the treatment.

Our invention involves in a general way the above described replacement of monovalent alkaline elements of the glass by metallic atoms, but in a method modified and combined with certain other discoveries which we have made. We have found that all optical, ophthalmic and other relatively pure glasses exhibit some fluorescence when subjected to ultra-violet radiation, due to minor elements added to the composition of the glass, such as antimony and lead. As disclosed in our copending patent application, Serial No. 583,398, filed March 17, 1945, Method of marking glass and its products, we have found that if the alkaline elements of the glass are replaced, as therein disclosed, by certain metallic atoms, and specifically copper ions, the fluorescent appearance of glass portions so treated, when irradiated by short wave ultra-violet light is distinctly altered so as to render such treated portions impressively visible in contrast with adjacent untreated portions of the glass.

We have now found, as an improvement on the above invention described and claimed in our said copending application, that the introduction of silver ions into the glass from certain silver salts produces a distinctly visible difference in the fluorescent appearance of glass so treated, as compared with untreated portions of most optical and other pure glasses, so as to render such treated portions impressively visible under irradiation by ultra-violet light. As in the case of the salts of other noble metals, the salts of silver tend generally to have a high rate of decomposition at a temperature at which the rate of diffusion into glass, as described above, is high. We have found unexpectedly, however, contrary to this general characteristic, that certain salts of silver hereafter specified are exceptional in behavior as regards such decomposition and, on the contrary, have a low rate of decomposition at a temperature at which the diffusion rate of silver into glass is high, as well as being substantially insoluble and stable when compounded with other substances to form treating reagents. Our invention involves the discovery of these unexpected characteristics and suitable ways and means for utilizing them, as well as the useful products which they afford.

That is, we have found that a group consisting of the substantially water-insoluble, slowly decomposing silver salts of the oxygen acids of a number of the elements may be employed in the heat treatment of the glass surface, this group consisting of the borate, metaphosphate, pyrophosphate, orthophosphate, vanadate, arsenate, antimonate, chromate, selenite, molybdate, tellurate, and tungstate salts of silver, or the hydrated salts of the same. Within a suitable range of time and temperature conditions, the low rate of decomposition of these salts produces only a low density of silver ions in the glass, as hereafter more fully described, which does not visibly alter the refractive index or appearance of the glass. By selecting suitable time and temperature conditions, however, such penetration of the silver ions into the glass may be continued to a substantial depth, as hereafter more fully described, so as to afford at the treated regions of the glass, a state of fluorescence which is conspicuously visible against the background fluorescence of the other untreated regions. Such treatment of the glass, of course, may be restricted to delimited portions corresponding to letters, figures, words, or other indicia forming a trade-mark or other identifying symbol, as well understood in the art. In this way the glass may be readily provided with markings which do not appreciably affect the index or color of the glass and are completely invisible under normal daylight or artificial illumination, but which become conspicuously fluorescent when subjected to short wave ultra-violet irradiation.

In carrying out our method, we prefer to employ one of the above silver salts obtained, for example, by treating the corresponding sodium or potassium salt with the molecular equivalent of silver sulfate, chloride, nitrate or carbonate, although the desired silver salt may be otherwise obtained. As a typical example, we prefer to use silver chromate obtained by taking 3.9 g. of potassium chromate ($K_2CrO_4$) and 6.8 g. of silver nitrate ($AgNO_3$), in water solution, mix, wash and decant the precipitate which is dried at 50° C. over night, and ground fine in a mortar. As another example, we use silver tungstate prepared by mixing aqueous solutions of 6.6 g. of sodium tungstate ($Na_2WO_4.2H_2O$) and 6.8 g. of silver nitrate ($AgNO_3$), wash and decant and dry the white precipitate at 50° C. for twenty-four hours, and grind it fine in a mortar, as above. As a further example, we may use silver molybdate obtained by taking 4.8 g. of sodium molybdate ($Na_2MO_4.2H_2O$) and 6.8 g. of silver nitrate ($AgNO_3$), in water solutions, mix, wash, decant and dry the precipitate at 50° C. for twenty-four hours, and grind the white salt fine in a mortar.

One of the above silver salts is mixed with a carrier substance, such as oil, grease, clay slips, titania, or the like, the salt being substantially insoluble and stable against any reaction with any solvent or moisture in the carrier substance which might form a solution injuriously affecting the surface of the glass. In preparing the paste, we prefer to take 95% of the silver salt and 5% of titania, for example, and add sufficient anhydrous lanolin to make a paste of proper consistency for application to the glass with a rubber stamp, as required by the temperature at the time of application.

The glass to be marked must be very clean, for which purpose it is preferably dipped in chromic acid and washed. The paste is applied to a desired portion of the glass with a rubber stamp and the glass article is then baked in an oven within time and temperature conditions ranging anywhere between the limits of one hour at 350° C. to three minutes at 600° C., the time varying inversely with the temperature and both with the desired intensity of marking. We have found, for example, that in the case of silver ions in crown glass, by the treatment hereafter described, a density may be obtained of not more than substantially 3% by weight of silver ions to glass in the treated layer and a penetration to a depth of 10 to 20 microns which does not visibly affect the appearance of the glass under normal illumination, but affords an impressively visible marking when irradiated with ultraviolet light, and the desirable density and depth of penetration of the metallic ions, under other conditions, may be readily determined by suitable tests, as well understood in the art.

We have found, for example, in marking spectacle crown glass, that treatment of the glass with silver chromate may be advantageously accomplished by subjecting it for twenty (20) minutes to an oven temperature of 430° C. In using silver tungstate and molybdate we have found treatment for twenty (20) minutes at an oven temperature of 400° C. to be satisfactory. The optimum time and temperature may be readily found in each particular case. After cooling, the glass is washed in water, or weak acid.

A mark applied to an ophthalmic lens, or other glass article, as described, may be made sharply visible by subjecting the article to irradiation by either short or long wave ultra-violet rays from an ordinary ultra-violet lamp emitting rays ranging in length between 2000 and 4000 angstrom units. The nature of the visibility is different, however, when irradiation is produced by short and long wave rays, respectively. When the lamp is equipped with a shield and filter which absorbs all visible rays and transmits ultra-violet rays below about 3000 units in length, the mark appears dark, with a faint bluish-green color, impressively visible on the bright background fluorescence of the untreated glass, due to the fact that the treated surface layer of the glass is rendered less permeable to ultra-violet light of short wave length and the fluorescence of the glass underlying the treated layer almost vanishes. On the other hand, when the lamp is equipped with a shield and filter which absorbs all visible rays and transmits ultra-violet rays between about 3000 to 4000 units in length, the irradiation of the glass causes the treated surface layer to fluoresce vividly with a golden yellow color which is impressively visible against the lower background fluorescence of the untreated areas of the glass, so as to render the mark distinctly visible and we prefer irradiation with these longer rays ranging approximately from 3000 to 4000 units in length. The glass article is preferably covered by a filter which stops the ultra-violet rays, to prevent injury to the eye of the observer, but transmits the visible, long or fluorescent rays, having a wave length of, say, 5500 units. Such viewing apparatus is simple and inexpensive in character, and the marking of the glass article is quickly, impressively and conveniently developed by irradiation in such an apparatus.

The above method and equipment and materials for carrying it out are comparatively simple and inexpensive and convenient to manipulate and produce a marking which is permanent and adapted to be quickly and conveniently developed in conspicuous form for observation by merely irradiating the glass article in the simple viewing apparatus described.

It will thus be seen that the invention accomplishes its objects, and while it has been herein disclosed by specific reference to the details of preferred method steps, materials and apparatus, such disclosure is intended in an illustrative, rather than a limiting sense, as it is contemplated that various modifications in the steps and means employed will occur to those skilled in the art, within the spirit of the invention and the scope of the appended claims.

We claim:

1. The method of marking glass having a polished surface comprising the steps of applying to a delimited portion of said surface a silver salt selected from the group consisting of the borate, metaphosphate, pyrophosphate, orthophosphate, vanadate, arsenate, antimonate, chromate, selenite, molybdate, tellurate and tungstate and the hydrates thereof, and heating the same to cause ions normally present in a layer of said glass adjacent said surface to be replaced by silver ions in a low and normally invisible degree of density but to a depth of penetration capable of producing a distinctly visible difference between the fluorescent appearances of the delimited and surrounding portions of said glass when subjected to ultra-violet irradiation.

2. The method of marking glass having a polished surface comprising the steps of applying to a delimited portion of said surface a substantially water-insoluble, slowly decomposing silver salt selected from the group consisting of the borate, metaphosphate, pyrophosphate, orthophosphate, vanadate, arsenate, antimonate, chromate, selenite, molybdate, tellurate and tungstate and the hydrates thereof, and heating the same to cause ions normally present in a layer of said glass not less than approximately ten microns deep adjacent said surface to be replaced by silver ions to a normally invisible density in said layer of not more than substantially 3% by weight of silver ions to glass, for producing a distinctly visible difference between the fluorescent appearances of the delimited and surrounding portions of said glass when subjected to ultra-violet irradiation.

3. The method of marking glass having a polished surface comprising the steps of applying to a delimited portion of said surface a silver salt selected from the group consisting of the borate, metaphosphate, pyrophosphate, orthophosphate, vanadate, arsenate, antimonate, chromate, selenite, molybdate, tellurate and tungstate and the hydrates thereof, and subjecting the same to heat treatment at a temperature and for a corresponding time period substantially within the range from a temperature of 350° C. for one hour to a temperature of 600° C. for three minutes, to cause ions normally present in a layer of said glass not less than approximately ten microns deep adjacent said surface to be replaced by silver ions to a density in said layer of not more than substantially 3% by weight of silver ions to glass, for producing a distinctly visible difference in fluorescent appearances between the delimited and surrounding portions, respectively, of said glass, when subjected to ultra-violet irradiation.

4. The method of marking glass comprising monovalent alkaline oxides and having a polished surface comprising the steps of applying to a delimited portion of said surface a compound having as its principal active ingredient a substantially water-insoluble, slowly decomposing silver salt selected from the group consisting of the borate, metaphosphate, pyrophosphate, orthophosphate, vanadate, arsenate, antimonate, chromate, selenite, molybdate, tellurate and tungstate and the hydrates thereof, subjecting the same to heat treatment at a temperature and for a corresponding time period substantially within the range from a temperature of 350° C. for one hour to a temperature of 600° C. for three minutes and thereby replacing monovalent alkaline elements of said oxides in a layer not less than approximately ten microns deep adjacent said surface by silver ions to a density in said layer of not more than substantially 3% by weight of silver ions to glass, for producing a distinctly visible difference between the fluorescent appearances of the delimited and surrounding portions, respectively, of said glass when subjected to ultra-violet irradiation.

NORBERT J. KREIDL.
LEWIS P. OHLIGER.

REFERENCES CITED

The following references are of record in the file of this patent:

UNITED STATES PATENTS

| Number | Name | Date |
| --- | --- | --- |
| 1,217,490 | Northwood | Feb. 27, 1917 |
| 1,302,353 | Friedrich | Apr. 29, 1919 |
| 1,475,473 | Drescher | Nov. 27, 1923 |
| 1,592,429 | Kraus | July 13, 1926 |
| 1,899,760 | Kreidl et al. | Feb. 28, 1933 |
| 2,030,440 | Fritze et al. | Feb. 11, 1936 |
| 2,056,809 | Smith | Oct. 6, 1936 |
| 2,245,783 | Hyde | June 17, 1941 |
| 2,270,307 | Karnes | Jan. 20, 1942 |
| 2,303,756 | Nordberg et al. | Dec. 1, 1942 |
| 2,333,329 | Miglarese | Nov. 2, 1943 |
| 2,340,013 | Nordberg et al. | Jan. 25, 1944 |
| 2,355,746 | Nordberg et al. | Aug. 15, 1944 |